United States Patent
O'Sullivan et al.

(10) Patent No.: US 8,355,631 B2
(45) Date of Patent: Jan. 15, 2013

(54) REDUCING OPTICAL SERVICE CHANNEL INTERFERENCE IN PHASE MODULATED WAVELENGTH DIVISION MULTIPLEXED (WDM) COMMUNICATION SYSTEMS

(75) Inventors: Maurice O'Sullivan, Ottawa (CA); Jamie Gaudette, Pembroke (CA); Roger Carroll, Ottawa (CA)

(73) Assignee: Ciena Corporation, Hanover, MD (US)

( * ) Notice: Subject to any disclaimer, the term of this patent is extended or adjusted under 35 U.S.C. 154(b) by 230 days.

(21) Appl. No.: 12/696,089

(22) Filed: Jan. 29, 2010

(65) Prior Publication Data

US 2011/0188861 A1 Aug. 4, 2011

(51) Int. Cl.
*H04B 10/08* (2006.01)

(52) U.S. Cl. ........... 398/33; 398/30; 398/31; 398/38; 398/177; 398/181; 398/79; 398/81; 398/37; 385/24; 385/37

(58) Field of Classification Search ............... 398/33, 398/34, 38, 30, 31, 32, 177, 180, 181, 141, 398/158, 159, 160, 81, 79, 174, 175, 176, 398/37, 82, 83, 84, 85, 10, 11, 13, 16, 17, 398/18, 20, 25, 26, 27; 385/24, 37
See application file for complete search history.

(56) References Cited

U.S. PATENT DOCUMENTS

| | | | |
|---|---|---|---|
| 2003/0081295 A1* | 5/2003 | Kamura | 359/174 |
| 2009/0190920 A1* | 7/2009 | Ohtani | 398/7 |
| 2010/0104276 A1* | 4/2010 | Komaki | 398/17 |
| 2010/0239259 A1* | 9/2010 | Forghieri et al. | 398/79 |
| 2011/0150481 A1* | 6/2011 | Yang et al. | 398/79 |

* cited by examiner

*Primary Examiner* — Hanh Phan
(74) *Attorney, Agent, or Firm* — Kent Daniels; Blake, Cassels & Graydon LLP

(57) ABSTRACT

A system for transmitting a plurality of data channels and an optical service channel through an optical fiber link of a Wavelength Division Multiplexed (WDM) optical communications system. The system comprises a first transmitter at a first end of the optical fiber link, for transmitting the data channels as a wavelength division multiplexed optical signal through the optical fiber link in a first direction. A second transmitter is connected at a second end of the optical fiber link, for transmitting the optical service channel through the optical fiber link in a second direction opposite to the first direction.

6 Claims, 3 Drawing Sheets

REDUCING OPTICAL SERVICE CHANNEL INTERFERENCE IN PHASE MODULATED WAVELENGTH DIVISION MULTIPLEXED (WDM) COMMUNICATION SYSTEMS

CROSS-REFERENCE TO RELATED APPLICATIONS

This is the first application filed in respect of the present invention.

FIELD OF THE INVENTION

The present application relates generally to Wavelength Division Multiplexed (WDM) optical communications systems, and more specifically, to reducing Optical Service Channel (OSC) interference in phase modulated Wavelength Division Multiplexed (WDM) systems.

BACKGROUND OF THE INVENTION

In optical communications networks, an Optical Service Channel (OSC) is used to convey operation administration and maintenance (OAM) signalling for managing line equipment. In Wavelength Division Multiplexed (WDM) optical communications systems, the optical service channel is typically an intensity modulated channel that is co-propagated with the data channels. This enables the same transmitter to be used to send the OAM signalling as well as subscriber traffic.

FIG. 1a schematically illustrates a representative optical fibre link 2 in a conventional WDM optical communications system. In the illustrated example, the fibre link 2 comprises three optical fiber spans 4 extending between a transmitter 6 and a receiver 8, and traverses an optical amplifier 10 and an Optical Add-Drop Multiplexers (OADM) 12. As is well known in the art, optical fibre links commonly have multiple spans, and include a variety of optical devices, such as optical amplifiers and OADMs, for example. Transmitters and receivers are commonly incorporated into network nodes which provide some combination of signal regeneration, electrical switching (such as wavelength switching), and layer-2 (or higher) signal routing functionality. Typically, a bidirectional optical link comprises a pair of parallel fibre links 2 extending between the two end nodes. Normally, these parallel fibre links will be constructed as a "mirror image" of each other, so as to convey optical signals in respective opposite directions. For this reason, only one fibre link is shown in FIG. 1a.

The transmitter 6 generates a WDM optical signal comprising a plurality of data channels $\lambda_{DATA}$ and at least one optical service channel $\lambda_{OSC}$, as may be seen in FIG. 1b. Typically, the optical spectrum of the WDM signal will follow a standard spectral grid such as one of the spectral grids specified by the International Telecommunications Union (ITU), for example.

Typically, data channels $\lambda_{DATA}$ of the link are considered to extend through the entire link 2 from the transmitter 6 to the receiver 8, and thus maintain continuity through each of the intermediate optical devices 10, 12. On the other hand, an optical service channel $\lambda_{OSC}$ is limited to one span 4, and thus is terminated at each of the intermediate optical devices 10, 12.

Accordingly, at each optical device within the link 2 (in this example, the optical amplifier 10 and the OADM 12), an optical coupler 16 (such as, for example, a passive filter-based optical demux) is used to separate the optical service channel $\lambda_{OSC}$ from the fibre link, and supply the optical service channel $\lambda_{OSC}$ to an OAM controller unit 18. In the illustrated example, the OAM controller unit 18 includes an OSC receiver 20; a processor 22; a regenerator 24 and an OSC transmitter 26. The OSC receiver 20 terminates the OSC channel $\lambda_{OSC}$ and recovers the OAM messages modulated on the OSC channel $\lambda_{OSC}$. The processor 22 may operate under software control to, among other things, implement OAM functions in respect of the respective optical device 10, 12. The processor 22 may also generate OAM messages (eg status reports and alarm notifications), which are passed to the OSC transmitter 26 for transmission through the OSC channel $\lambda_{OSC}$ of the next span. The regenerator 24 can be used to implement a "pass-through" function, so that received OAM messages that are not destined for the OAM controller 18 can be passed to the OSC transmitter 26 for transmission through the OSC channel $\lambda_{OSC}$ of the next span. A second optical coupler 28 (such as, for example, a passive filter-based optical mux) adds the optical service channel $\lambda_{OSC}$ from the OSC transmitter 26 to the WDM signal for transmission through the next span.

At the receiver 8, the Optical Service Channel $\lambda_{OSC}$ is demultiplexed from the WDM signal and received in a conventional manner. The received OAM signals then can be forwarded by the receiver 8 to a central network server (not shown) in a manner well known in the art.

With this arrangement, each OAM controller unit 18 can receive OAM messages through the inbound optical service channel $\lambda_{OSC}$, and thereby implement management functionality in respect of the associated optical device. In addition, the OAM controller unit 18 can generate and transmit OAM messages through the next span optical service channel $\lambda_{OSC}$. The regenerator 22 enables the OAM controller unit 18 to regenerate and transmit OAM signals pertaining to other OAM controller units 18 on the same fibre link 2. In the case of multi-span fibre links, this operation enables any given OAM controller unit 18 to communicate with a central network management server (not shown), with OAM messages to and from the given OAM controller unit 18 being relayed through the transmitter 6 and receiver 8, and any intermediate OAM controller units 18 on the fibre link 2

As is well known in the art, the arrangement described above enables effective implementation of OAM functionality in each respect of each optical device 10, 12 along the optical fibre link 2. However, this arrangement also suffers a limitation in that fiber non-linear effects such as Cross-Phase Modulation (XPM) and four-wave mixing can cause interference between the optical service channel $\lambda_{OSC}$ and the data channels $\lambda_{DATA}$. When data channels operate using intensity modulation direct detection, the magnitude of the signal degradation due to this is interference is typically much lower than dispersion, and thus can be tolerated. However, when data transmission relies on detection of phase modulation non-linear distortions in the data channels $\lambda_{DATA}$ due to OAM signalling in the optical service channel $\lambda_{OSC}$ can cause significant degradation in the SNR of the data channels $\lambda_{DATA}$.

Techniques that mitigate interference between the optical service channel $\lambda_{OSC}$ and the data channels $\lambda_{DATA}$ in a Wavelength Division Multiplexed (WDM) optical communications system remain highly desirable.

SUMMARY OF THE INVENTION

An aspect of the present invention provides a system for transmitting a plurality of data channels and an optical service channel through an optical fiber link of a Wavelength Division Multiplexed (WDM) optical communications system.

The system comprises a first transmitter at a first end of the optical fiber link, for transmitting the data channels as a wavelength division multiplexed optical signal through the optical fiber link in a first direction. A second transmitter is connected at a second end of the optical fiber link, for transmitting the optical service channel through the optical fiber link in a second direction opposite to the first direction.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENTS

The present invention provides techniques for reducing nonlinear interference between the Optical Service Channel $\lambda_{OSC}$ and the data channels $\lambda_{DATA}$ of a WDM optical communications system. Representative embodiments are described below with reference to FIGS. 2-3.

In principle, nonlinear interference between the Optical Service Channel (OSC) $\lambda_{OSC}$ and the data channels $\lambda_{DATA}$ of a WDM optical communications system can be mitigated using a variety of strategies, including, for example, increasing the separation between the OSC and the nearest data channel $\lambda_{DATA}$, reducing the optical power of the OSC, changing the modulation format of the OSC, and increasing the bandwidth of the OSC.

The nonlinear phase modulation of a phase modulated data channel $\lambda_{DATA}$ of a WDM optical communications system by a co-propagating intensity modulated OSC can be modeled as a low pass transfer function between the intensity of the OSC and the phase-shift imparted to the data channel. The bandwidth of this XPM transfer function only depends on the product of local dispersion and the separation (spectral distance) between the OSC and the data channel and on fiber loss coefficient. For increasing OSC bandwidths, as the bandwidth of the OSC exceeds the XPM transfer function bandwidth, the phase modulation power imparted to the data channel decreases owing to the low pass nature of the transfer function. Accordingly, the nonlinear modulation of the data channel by the OSC can be reduced by increasing the OSC bandwidth.

Other strategies that may be used for reducing nonlinear interference between the OSC and the data channel including, for example, increasing the separation between the OSC and the nearest data channel, reducing the optical power of the OSC, and changing the modulation format of the OSC.

While viable, each of these strategies suffers a limitation in that they require modification of the channel plan in an optical fibre link and/or involve alteration of the OSC performance, both of which may be undesirable.

Figure 2A:
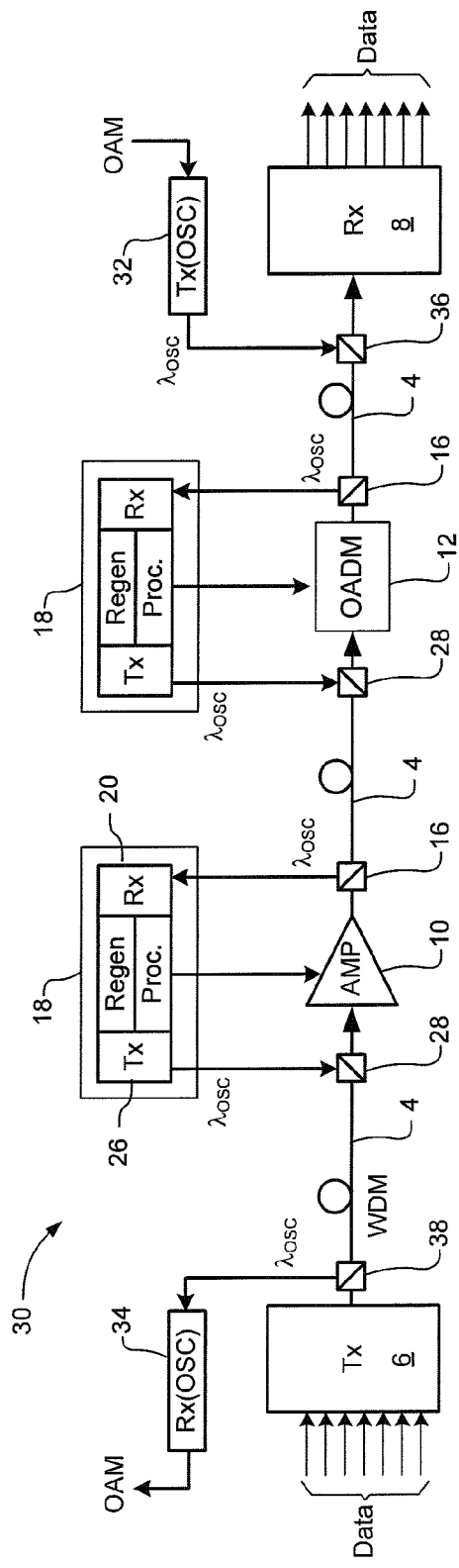
FIGS. 2a and 2b schematically illustrate a WDM optical link incorporating a first representative embodiment of the present invention.
Figure 2B:
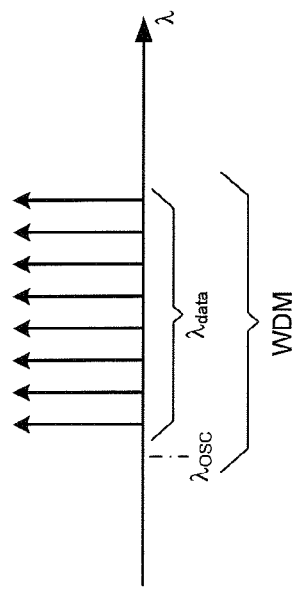

Accordingly, in a preferred embodiment, nonlinear interference between the Optical Service Channel (OSC) $\lambda_{OSC}$ and the data channels $\lambda_{DATA}$ of a WDM optical communications system is mitigated by arranging the direction of propagation of the OSC within each span to be opposite that of the data channels $\lambda_{DATA}$. Reverse propagation of the OSC in this manner significantly reduces degradation of the data channels due to cross-phase modulation and four-wave mixing from the OSC. FIG. 2a, schematically illustrates a representative link in an optical communications system in which this technique is utilized.

Figure 1A:
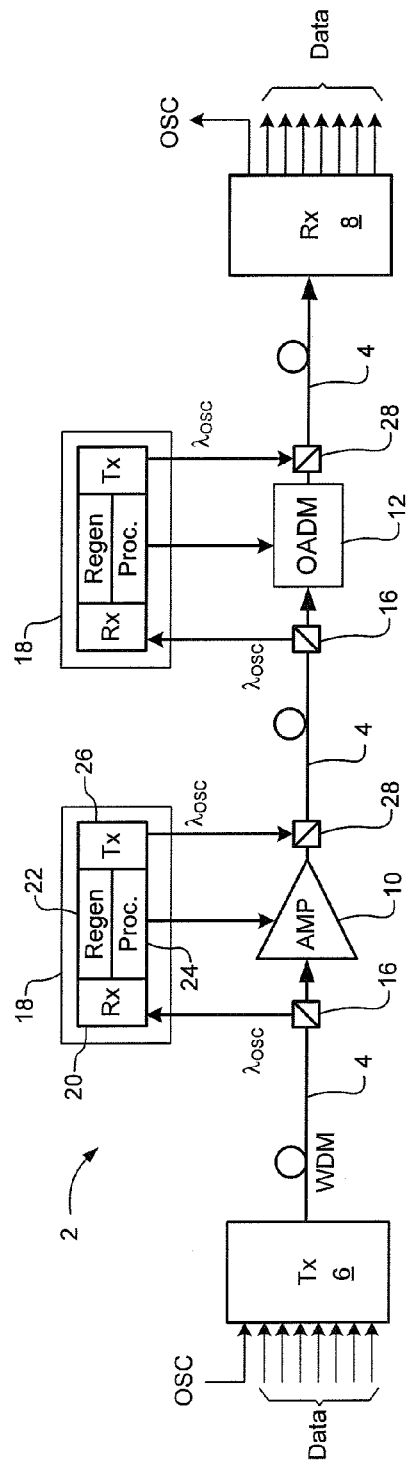
FIGS. 1a and 1b schematically illustrate a conventional WDM optical link known in the prior art.
Figure 1B:
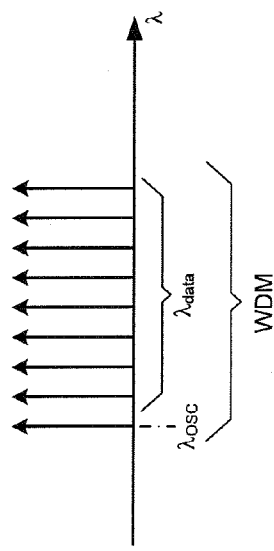

The embodiment of FIG. 2a is similar to that of FIG. 1a, in that an optical fibre link 30 comprises three optical fiber spans 4 extending between a transmitter 6 and a receiver 8, and traverses an optical amplifier 10 and an Optical Add-Drop Multiplexer (OADM) 12. However, the embodiment of FIG. 2a differs from the prior art in that the transmitter 6 generates a WDM optical signal comprising only the data channels $\lambda_{DATA}$, and omitting the optical service channel $\lambda_{OSC}$, as may be seen in FIG. 2b. Preferably, the data channels $\lambda_{DATA}$ are arranged according to a standard spectral grid such as, for example, one of the spectral grids specified by the ITU. At the receiver 8 end of the fibre link, the data channels $\lambda_{DATA}$ are demultiplexed and received in a conventional manner.

In the embodiment of FIG. 2a, reverse-propagation of the optical service channel(s) $\lambda_{OSC}$ is accomplished by providing an OSC transmitter 32 at the receiver end of the link 30; an OSC receiver 34 at the transmitter end of the link 30; and reversing the optical connectivity of the OSC controllers 18 at each optical device 10,12. The OSC transmitter 32 is optically coupled to the optical fiber link 30 via a wavelength-selective coupler 36, such as a filter-based optical MUX, so as to launch the optical service channel $\lambda_{OSC}$ toward the transmitter end of the fiber link 30.

At each optical device within the link (in the example of FIG. 2a, the OADM 12 and the optical amplifier 10), the optical service channel $\lambda_{OSC}$ is separated from the fiber link 30 by an optical coupler 16 and supplied to an OAM controller unit 18. The optical service channel $\lambda_{OSC}$ of the next span is inserted into the fibre by an optical coupler 28. This arrangement is closely similar to that of the prior art system described above with reference to FIG. 1a, and indeed conventional OAM controller unit 18 and optical couplers 16, 28 may be used for this purpose. However, in this case, the optical connections between the optical couplers 16, 28 and the OAM controller unit 18 are "reversed" to accommodate the fact that the optical service channel $\lambda_{OSC}$ is propagating through each span 4 of the fibre link 30 is a direction opposite that of the data channels.

At the transmitter end of the link 30, the optical service channel $\lambda_{OSC}$ is separated from the fiber link 30 (for example using a filter-based optical demux 36) and supplied to an OSC receiver 34, which terminates the OSC $\lambda_{OSC}$ and recovers the OAM signalling modulated on the OSC $\lambda_{OSC}$. The recovered OAM signalling may then be forwarded to a central management server (not shown), if desired.

As will be appreciated, the embodiment of FIG. 2a can be implemented in a bidirectional optical link by simply duplicating the arrangement for each direction. However, such a solution would then require that the OAM messaging for each direction of the bidirectional link, which is sent from a central management server (not shown), would have to be routed to the opposite end of the link, as compared to the case of conventional co-propagated optical service channels. This change may be undesirable, particularly in networks in which some links use reverse-propagating optical service channels in accordance with the present invention, which other links retain conventional co-propagating optical service channels.

Figure 3:
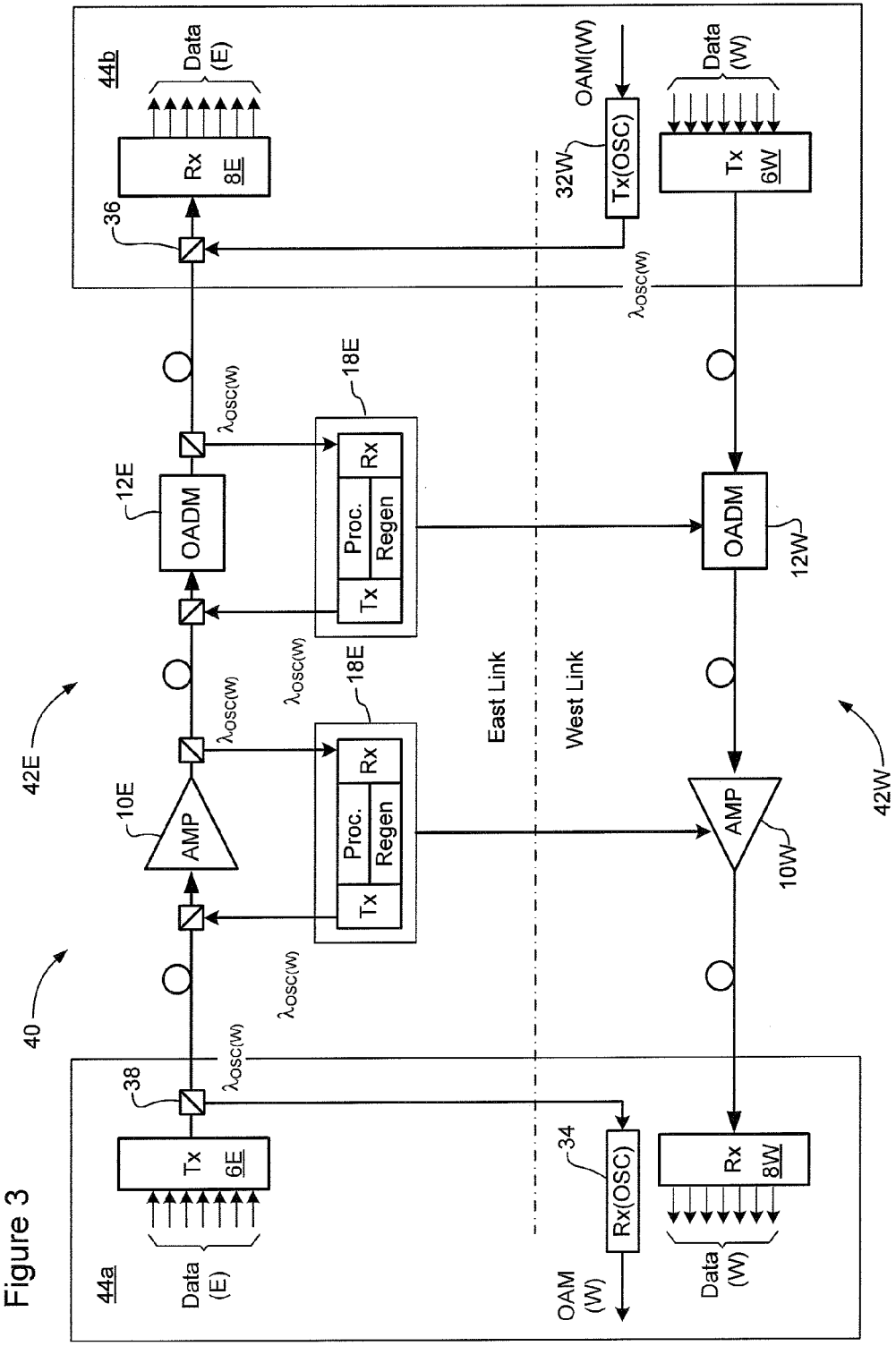
FIG. 3 schematically illustrates a WDM optical link incorporating a second representative embodiment of the present invention.

FIG. 3 illustrates an embodiment which overcomes this difficulty.

FIG. 3 illustrates an embodiment of the present invention implemented in a bi-directional optical link 40 extending between adjacent nodes 44a and 44b, which terminate the data channels of the link 40. As may be seen in FIG. 3, the optical link 40 comprises a pair of parallel optical fibre links 42, each of which is configured to carry WDM data traffic channels in respective opposite directions between corresponding transmitters 6 and receivers 8. For convenience, these directions are nominally designated as East and West directions, and elements associated with each direction designated with subscripts E and W, respectively.

Within each fibre link 42, the respective OSC controller units 18 are connected to receive and transmit their corresponding OSC channel $\lambda_{OSC}$ as described above with reference to FIG. 2a. Thus, at node 44b, OSC messages for the West link 42W are modulated onto the West OSC $\lambda_{OSC(W)}$, and transmitted by the West OSC transmitter 32W. The West OSC $\lambda_{OSC(W)}$ is then coupled into the East link 42E, and so propagates in a reverse direction (relative to the East data channels) to the first OAM controller unit 18E, where it is terminated and the OSC messages recovered, largely as described above with reference to FIG. 2a. The OAM controller Unit 18E, operates to process (and/or pass-through) received OAM messages to implement OAM functionality as described above, except that in this case, the OAM functionality is implemented in respect of the associated optical device 10W of the West link.

It will be appreciated that the East link OSC and OAM signalling can be implemented as a mirror image of the West link OSC illustrated in FIG. 3. Accordingly, the East link OSC and OAM signalling are not shown to avoid un-necessary clutter in the illustration.

An advantage of the arrangement of FIG. 3 is that it utilizes the existing OSC transmitters and receivers in each end node 44 of the link, and OAM messaging can be routed between the central management server and each end node in exactly the same manner as would be the case for conventional co-propagating optical service channels. As such, the changes required to implement reverse OSC propagation on the bi-directional link, are confined to that link, and are transparent to the rest of the network. As a result, co-propagating and reverse propagating optical service channels can co-exist within the same network (albeit on different links). Thus the embodiment of FIG. 3 provides a method of upgrading legacy bidirectional network links to reduce non-linear distortions suffered by the data channels $\lambda_{DATA}$, by connecting the East and West OSC transmitters and receivers in the two end nodes 44 to the opposite direction fibers; modifying (that is, reversing) the connectivity between the each OSC control unit 18 and its respective fibre link 42 to accommodate the reverse-propagating optical service channels; and then re-configuring each connecting each OSC control unit 18 to implement OAM functionality in respect of a respective optical device on the opposite direction fibre link.

In the foregoing description, the invention is described by way of representative embodiments in which a single optical service channel $\lambda_{OSC}$ is provided. It will be appreciated, however that the techniques of the present invention can equally be used in embodiments having multiple optical service channels.

The embodiments of the invention described above are intended to be illustrative only. The scope of the invention is therefore intended to be limited solely by the scope of the appended claims.

We claim:

1. A method of transmitting a plurality of data channels and an optical service channel through an optical fiber link of a Wavelength Division Multiplexed (WDM) optical communications system, the optical fiber link comprising first and second optical fiber spans separated by an optical device, the method comprising:
   transmitting the data channels as a wavelength division multiplexed optical signal through the optical fiber link in a first direction; and
   transmitting the optical service channel having operation administration and maintenance (OAM) messages modulated thereon through each optical fiber span of the optical fiber link in a second direction opposite to the first direction;
   providing a first optical coupler connected to the first optical fiber span proximal an output the optical device, the first optical coupler being configured to permit the wavelength division multiplexed optical signal to propagate through the first optical fiber span in the first direction, and further configured to separate the optical service channel from the first span, the optical service channel propagating through the first optical fiber span in the second direction; and
   providing a second optical coupler connected to the second optical fiber span proximal an input of the optical device, the second optical coupler being configured to permit the wavelength division multiplexed optical signal to propagate through the second span in the first direction, and further configured to launch the optical service channel in the second direction through the second optical fiber span.

2. A system for transmitting a plurality of data channels and an optical service channel (OSC) through an optical fiber link of a Wavelength Division Multiplexed (WDM) optical communications system, the optical fiber link comprising first and second optical fiber spans separated by an optical device, the system comprising:
   a first transmitter at a first end of the optical fiber link, for transmitting the data channels as a wavelength division multiplexed optical signal through the optical fiber link in a first direction;
   a second transmitter at a second end of the optical fiber link, for transmitting the optical service channel having operation administration and maintenance (OAM) messages modulated thereon into the optical fiber link in a second direction opposite to the first direction;
   a first optical coupler connected to the first optical fiber span proximal an output the optical device, the first optical coupler being configured to permit the wavelength division multiplexed optical signal to propagate through the first optical fiber span in the first direction, and further configured to separate the optical service channel from the first span, the optical service channel propagating through the first optical fiber span in the second direction; and
   a second optical coupler connected to the second optical fiber span proximal an input of the optical device, the second optical coupler being configured to permit the wavelength division multiplexed optical signal to propagate through the second span in the first direction, and further configured to launch the optical service channel in the second direction through the second optical fiber span.

3. The system as claimed in claim 2, wherein the first transmitter is a WDM transmitter and the second transmitter is an OSC transmitter optically coupled to the optical fiber link.

4. The system as claimed in claim 2, wherein the system further comprises:
   an OAM controller unit connected to the first and second optical couplers, the OAM controller unit comprising:
     a receiver for terminating the separated optical service channel from the first coupler, and for receiving OAM messages modulated on the terminated optical service channel; and
     a transmitter for transmitting OAM messages through the optical service channel of the second span.

5. The system as claimed in claim 4, wherein the OAM controller unit further comprises a processor configured to implement management functionality in respect of the optical device, based on the received OAM messages.

6. The system as claimed in claim 4, wherein the OAM controller unit further comprises a processor configured to implement management functionality in respect of an associated optical device of another optical fibre link.

* * * * *